United States Patent [19]

Patino et al.

[11] Patent Number: 5,241,259
[45] Date of Patent: Aug. 31, 1993

[54] METHOD AND APPARATUS FOR RAPIDLY CHARGING A BATTERY AT HIGH TEMPERATURE

[75] Inventors: Joseph Patino, Plantation; Daniel M. Nigro, Lauderhill; John D. Fiske, II, Pompano Beach, all of Fla.

[73] Assignee: Motorola, Inc., Schaumburg, Ill.

[21] Appl. No.: 894,129

[22] Filed: Jun. 4, 1992

[51] Int. Cl.$^5$ .............................................. H02J 7/04
[52] U.S. Cl. ........................................ 320/35; 320/20; 320/22
[58] Field of Search ....................... 320/20, 21, 22, 23, 320/24, 31, 32, 39, 40, 35, 36

[56] References Cited

U.S. PATENT DOCUMENTS

| | | | |
|---|---|---|---|
| 3,599,071 | 8/1971 | Lapuyade et al. | 320/35 |
| 3,852,652 | 12/1974 | Jasinski | 320/35 |
| 3,917,990 | 11/1975 | Sherman, Jr. | 320/35 |
| 4,125,802 | 11/1978 | Godard | 320/35 |
| 4,712,055 | 12/1987 | Houser, Jr. | 320/35 |
| 4,727,306 | 2/1988 | Misak et al. | 320/35 |
| 4,829,226 | 5/1989 | Nakamura et al. | 320/35 |
| 5,103,156 | 4/1992 | Jones et al. | 320/35 |
| 5,122,722 | 6/1992 | Goedken et al. | 320/35 X |

FOREIGN PATENT DOCUMENTS

| | | | |
|---|---|---|---|
| 3214745 | 7/1983 | Fed. Rep. of Germany | 320/35 |
| 0138932 | 5/1989 | Japan | 320/35 |
| 0095141 | 4/1990 | Japan | 320/35 |
| 0299430 | 12/1990 | Japan | 320/35 |

OTHER PUBLICATIONS

Motorola Saber Series, "Single-Unit Rapid-Charge Battery Chargers", Jun. 1987, pp. 1-3.

Primary Examiner—Kristine L. Peckman
Attorney, Agent, or Firm—Robert S. Babayi

[57] ABSTRACT

A battery charger (230) is provided for charging a battery (210) at high temperatures. The charger (230) includes a thermistor (236) for monitoring the ambient temperature and a rapid charger (232) for providing the charge current to the battery. When the ambient temperature exceeds a high threshold temperature and when the battery (210) needs to be charged at this temperature, the battery charger (230) rapid charges the battery until the battery temperature reaches a cut-off temperature. The cut-off temperature is a temperature having a fixed level above the ambient temperature.

12 Claims, 2 Drawing Sheets

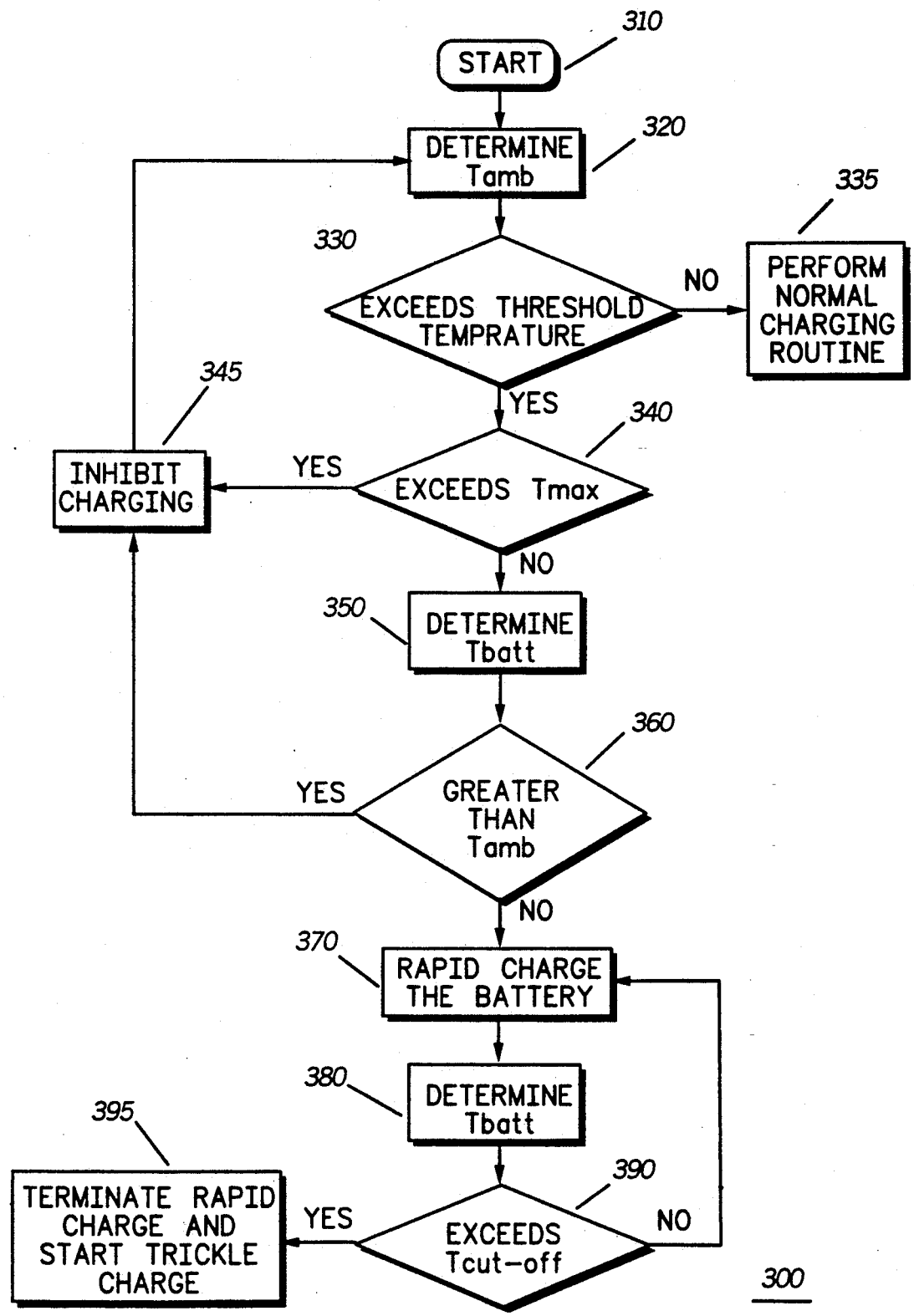

METHOD AND APPARATUS FOR RAPIDLY CHARGING A BATTERY AT HIGH TEMPERATURE

TECHNICAL FIELD

This invention relates generally to a method and an apparatus for charging a battery and particularly for rapid charging a battery at high temperatures.

BACKGROUND

Battery charges provide charge current to batteries in a wide variety of applications. Generally, in these applications, rechargeable batteries provide the energy for operating many electronic communication devices such as portable two-way radios and pagers.

One of the popular types of rechargeable batteries is a Nickle-Cadmium (Ni-Cad) battery. The Ni-Cad batteries may be charged fairly rapidly by application of large charge current to their terminals. The Ni-Cad batteries are also capable of sourcing large current to the electronic device after they are charged, while being packaged in substantially small enclosures. Conventionally, a Ni-Cad battery may be charged in one of two modes: a rapid charge mode or a trickle charge mode. In the rapid charge mode, the battery charger supplies the battery with a steady charge current for a substantially short period of time (typically 1 to 2 hrs). In the trickle charge mode, the battery charger supplies a small charge current generally to prevent the battery from discharging and losing its maximum capacity. It is, therefore, customary to rapid charge the battery to its near full capacity and then revert to the trickle charge mode for maintaining the battery capacity.

Under normal ambient temperature conditions (e.g., at room temperature), a depleted battery absorbs most of the energy provided by the charge current. Thus, at the start of the charge cycle, the voltage across battery increases rapidly as the charge current energy increases the battery capacity. However, when the battery is charged to near full capacity, the energy provided by the charge current is not as efficiently absorbed and the battery voltage starts to level off. The excessive energy not absorbed by the battery is dissipated in the form of heat which also increases the battery temperature. Therefore, as a result of excessive application of the charge current, the heat generated could adversely effect battery life and in extreme circumstances may even cause the battery to explode. In less extreme circumstances, the excessive charge current would destroy battery electrolytes, thereby shortening the battery life. Therefore, maintaining proper limits for application of the charge current becomes an important consideration during the charge cycle.

Conventional battery chargers include sensing means for terminating charge current supply upon completion of the charge cycle. The methods of sensing the end of charge cycle usually entail monitoring one of either the battery voltage or the battery temperature. In one conventional approach known as delta voltage scheme, the battery charger continuously measures the voltage across the battery terminals in order to determine the rate of change of the battery voltage. During the rapid charge mode, the battery charger compares successive rate of change determinations and upon detection of a certain rate of change threshold, the rapid charge mode is terminated.

Another known conventional approach is a delta temperature scheme where instead of monitoring the battery voltage, the battery charger monitors the rate of change in battery temperature. In this approach, a thermistor disposed within the battery package provides the battery charger with information relating to the battery temperature. The battery charger determines the rate of change of the battery temperature by successive comparison of the temperature measurements. Again, when the rate of change exceeds a threshold, the rapid charge mode is terminated. As an additional safety feature, some chargers would also prevent a battery from being charged all together, if the battery temperature is above a maximum temperature.

Although the delta voltage and delta temperature schemes described above work well under normal operating environments, at high temperature environments, such as those existing in hot deserts, the chargers may not function as adequately. This is because at high temperatures, the rate of change of the battery voltage and the battery temperature level off, making it hard to detect any rate of change. Therefore, the charger could fail to detect the threshold change required for terminating the charge current. At other instances, the ambient environment temperature may be higher than maximum temperature inhibiting the battery from being charged all together.

One prior art battery charger monitors the ambient temperature and upon detection of temperatures above a certain threshold, the rapid charge mode is disabled and the battery charger enters into the trickle charge mode. This approach, however, does not address the problem of rapid charging the battery at high temperatures. Therefore, a need exists for charging the batteries at high temperatures without causing battery damage.

SUMMARY OF THE INVENTION

Briefly, according to the invention, there is provided a method and apparatus for charging a battery at high ambient temperatures in which a determination is made as to whether the ambient temperature exceeds a threshold high temperature. If the ambient temperature exceeds the threshold high temperature, the battery is rapid charged until the battery temperature reaches a cut-off temperature. The cut-off temperature is a temperature having a fixed level above the ambient temperature.

BRIEF DESCRIPTION OF THE DRAWINGS

FIG. 2 is a flow chart of the operational steps for performing the charging method according to the present invention.

DETAILED DESCRIPTION OF THE PREFERRED EMBODIMENT

Figure 1:
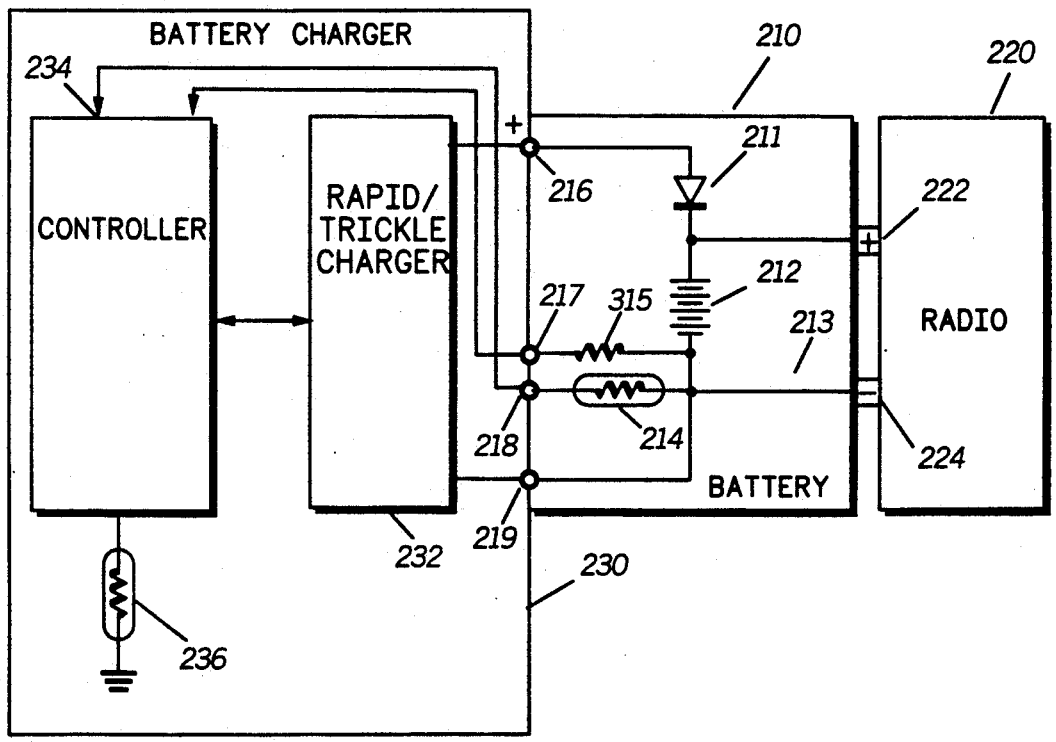
FIG. 1 is a schematic diagram of a radio, battery, and a battery charger which operate according to the present invention.

Referring to FIG. 1, a diagram 200 is shown which includes a battery powered radio 220, a battery 210 and a battery charger 230. The radio 220 and the battery 210 are well-known devices, such as the SABER ® portable two-way radio and its battery as manufactured by Motorola, Inc. The battery charger 230 incorporates the principles of the present invention to charge the battery 210 at high ambient temperatures. A battery charger and its general operations are also well known. One such charger comprises the SABER ® battery charger also manufactured by Motorola Inc., which is incorporated herein by reference and which may be modified to implement the principles of the present invention.

Generally, the battery 210 is positioned in an accommodating pocket formed within the housing of the battery charger 230 with or without the radio 220 being attached thereto. Once positioned therein, the battery charger 230 interfaces with the battery 210 through terminals 216, 217, 218 and 219. As such, the battery charger 230 may supply charge current to the battery 210 through battery terminals 216 and 219.

The battery 210 includes a plurality of battery cells 212 comprising well-known nickel-cadmium cells for sourcing energy to the radio 220 via a positive battery terminal 222 and a negative battery terminal 224. A diode 211 is coupled between the battery cell 212 and the battery contact 216 to prevent current flow from the battery cells 212 into the charger 230. A thermistor 214 within the battery 210 is coupled to the battery contact 218 to provide the battery charger 230 with information relating to the battery temperature. A resistor 315 also provides information relating to the battery capacity to the battery charger 230.

The battery charger 230 generally includes a well-known charger controller section 234 and a rapid/trickle charger section 232. The battery charger 230 also includes an ambient temperature thermistor 236 which provides ambient temperature information relating to the environment of the battery charger 230. The charger section 232 comprises well known battery charger circuitry which may be adapted to operate in the rapid or trickles charge modes. The ambient temperature thermistor 236 continually monitors the ambient temperature of the environment and provides a voltage potential corresponding thereto. The controller 234 interfaces internally with the charger portion 232 and the thermistor 236 and processes the ambient temperature information for providing operational control. The controller also receives battery temperature information form the battery thermistor 214. As such, by detecting the voltage across the battery thermistor 214 and the ambient temperature thermistor 236, the controller 234 may determine how to proceed with the charging function. Therefore, the controller 230 is responsive to the ambient temperature and the battery temperature for controlling the battery charging function.

According to the invention, at normal operating temperatures, the battery charger 230 rapid charges the battery 210 using normal charge routines, such as the delta temperature or the delta voltage schemes. However, once the ambient temperature has passed a threshold high temperature, the normal charge routines are abandoned and the battery is rapid charged until the battery temperature reaches a cut-off temperature. The cut-off temperature comprises a temperature which has a fixed level above the ambient temperature.

Referring to FIG. 2, a detailed flow chart 300 of the steps taken for achieving the objects of the present invention is shown. It may be appreciated that these steps may be appropriately programmed into the controller 234 using well-known programming techniques. Note that the controller 234 and its operational program also comprise the means for achieving the steps shown in FIG. 2.

The program starts at block 310 by initializing appropriate parameters. The controller 340 then determines the ambient temperature by checking the voltage across the ambient temperature thermistor 236, block 320. A decision is made as to whether the ambient temperature exceeds the threshold high temperature, block 330. The threshold high temperature comprises ambient environment temperature above which the battery may not be appropriately charged using normal charge routines. In other words, at temperatures exceeding the threshold high temperature, the rate of change of the battery voltage or the battery temperature are such that a determination as to whether the battery has reached near full capacity may not be made. Typically, this temperature is around 40 to 45 degrees C. Therefore, if ambient temperature is below the threshold high temperature or it is equal thereto, the battery charger performs its normal charging routine, i.e., delta temperature or delta voltage, block 335. However, above the threshold high temperature, the charger 230 proceeds with charging the battery routine according to the invention. Once it is determined that the ambient temperature exceeds the threshold high temperature, a decision is made as to whether the ambient temperature is also above a maximum operating temperature, block 340. The maximum operating temperature is a temperature beyond the specified operating temperature range of the battery. Thus, if the ambient temperature exceeds the maximum operating temperature, the charger is inhibited from charging the battery regardless of the battery capacity, block 345. If the operating temperature does not exceed the maximum operating temperature, the battery charger 230 determines the battery temperature by measuring the voltage across the battery thermistor 214, block 350. If the battery temperature is greater than the ambient temperature, battery charging is inhibited, block 345. This step assumes that a battery temperature greater than the ambient temperature indicates that the battery has been recently charged and does not need to be charged again. Therefore, the charging of the battery is inhibited and the step returns to block 320 to resume monitoring of the ambient temperature. However, if the battery temperature is below the ambient temperature, it is assumed that the battery needs to be charged. Thus, the battery is rapid charged by the controller 234 through the rapid/trickle charger section 232, block 370. While the battery 210 is being rapid charged, the battery temperature is continuously measured, block 380, until it reaches a cut-off temperature, block 390. The cut-off temperature comprises a temperature level having a fixed level above the ambient temperature. Empirically, it has been found that a cut-off temperature which is 6 to 7 degrees C above the ambient temperature allows the charger 230 to supply enough charge current for charging a depleted battery to 68 percent of its capacity. It has also been found that providing charge current that increases the battery temperature beyond this empirical cut-off temperature does not substantially increase the battery capacity. Therefore, once the battery temperature has exceeded the cut-off temperature, the battery charger terminates the rapid charge mode and starts to trickle charge mode to maintain the battery capacity, block 395.

The present invention could be implemented by modifying the software of the existing battery chargers to incorporate the principles of the invention. The hardware of such charger must also be modified slightly to add the ambient temperature thermistor. By charging the battery according to the present invention, the temperature of the battery is raised by a fixed amount above the high ambient temperature without damaging the battery. Furthermore, since the battery temperature is raised by a fixed amount, there is no need to monitor the rate of change of the battery voltage or the rate of the battery temperature at high ambient temperatures. Accordingly, the present invention provides a simple and safe method for charging batteries to significant capacity at high temperature.

What is claimed is:

1. A method for charging a battery at high temperature by a battery charger, comprising steps of:
   a) determining battery temperature at an ambient temperature of the battery charger;
   b) determining whether the ambient temperature exceeds a threshold high temperature; and
   c) rapid charging the battery if the ambient temperature exceeds the threshold high temperature until the battery temperature reaches a cut-off temperature.

2. The method of claim 1, wherein said step (c) further comprises the step of:
   (c)(1) inhibiting rapid charging of the battery if the battery temperature is greater than the ambient temperature.

3. The method of claim 1, wherein said step (c) further comprises the step of:
   (c)(1) inhibiting rapid charging of the battery if the ambient temperature is greater than a maximum ambient temperature.

4. The method of claim 1, further including the step of:
   (d) trickle charging the battery after the battery temperature has reached the cut-off temperature.

5. The method of claim 1, wherein said cut-off temperature is a temperature having a fixed level above the ambient temperature.

6. An apparatus for charging a battery at high temperatures by a battery charger, comprising:
   means for determining battery temperature at an ambient temperature of the battery charger;
   means for determining whether the ambient temperature exceeds a threshold high temperature; and
   means for rapid charging the battery if the ambient temperature exceeds the threshold high temperature until the battery temperature reaches a cut-off temperature.

7. The apparatus of claim 6, wherein said means for rapid charging the battery further includes means for inhibiting rapid charging of the battery if the battery temperature is greater than the ambient temperature.

8. The apparatus of claim 6, wherein said means for rapid charging the battery further includes means for inhibiting rapid charging of the battery if the ambient temperature is greater than a maximum ambient temperature.

9. The apparatus of claim 6, further including means for trickle charging the battery after the battery temperature has reached the cut-off temperature.

10. The apparatus of claim 6, wherein said cut-off temperature comprises a temperature having a fixed level above the ambient temperature.

11. A charger for a battery, comprising:
    sensor means for monitoring ambient temperature;
    temperature determination means for determining battery temperature; and
    rapid charger means responsive to said sensor means for rapid charging said battery when the ambient temperature exceeds a threshold high temperature, wherein said rapid charger means is also responsive to the determination means for terminating charging of the battery when the battery temperature reaches a cut-off temperature.

12. The battery charger of claim 11, wherein said cut-off temperature comprises a temperature having a fixed level above the ambient temperature.

* * * * *